Dec. 10, 1968  A. W. VAN GILS  3,415,331
PROCESS AND AN APPARATUS FOR BRINGING UNDER CONTROL
AN UNEXPECTEDLY PRODUCING WELL
Filed Oct. 25, 1965  6 Sheets-Sheet 2

Inventor
A. W. van Gils
By Jack F. Ockuff,
attys.

United States Patent Office 3,415,331
Patented Dec. 10, 1968

3,415,331
PROCESS AND AN APPARATUS FOR BRINGING UNDER CONTROL AN UNEXPECTEDLY PRODUCING WELL
Adrianus Wilhelmus van Gils, % B.S.P. Co. Ltd., Seria, Brunei, British Borneo
Filed Oct. 25, 1965, Ser. No. 505,184
9 Claims. (Cl. 175—65)

ABSTRACT OF THE DISCLOSURE

The invention relates to the method and apparatus for bringing an undesirably producing well under control. The heavier mud for bringing the mud under control is pumped into the drill pipe by a pump driven by the pressure difference between the fluid being discharged by the well and the pressure in the drill pipe, there being a fixed relationship between the quantity of the heavier mud pumped into the well and the quantity of the fluid being discharged from the well, a smaller quantity of the heavier mud being pumped in until the well is brought under control.

---

The invention relates to the method and apparatus for bringing an undesirably producing well under control. The heavier mud for bringing the mud under control is pumped into the drill pipe by a pump driven by the pressure difference between the fluid being discharged by the well and the pressure in the drill pipe, there being a fixed relationship between the quantity of the heavier mud pumped into the well and the quantity of fluid being discharged from the well, a smaller quantity of the heavier mud being pumped in until the well is brought under control. The invention also relates to the apparatus for carrying out this method.

When drilling a hole for obtaining natural oil or gas a bit is used connected to the lower end of an extensible drill pipe, which bit has a greater diameter than the drill pipe to which it has been connected. The bit is rotated and the bit drills a hole which is larger than the drill. Furthermore so-called mud is used, i.e. water or oil mixed with clay and chemicals, by which the specific gravity of the mud is higher than that of water. The quantity of admixed heavier substances determines the specific gravity of the mud and this can be altered according to circumstances. The mud is pumped down through the drill pipe, flows through one or more holes in the bit and then upwards through the annulus between the drill pipe and the wall of the hole already drilled. The mud carries along the cuttings to the surface. The mud serves also to support, by its hydrostatic pressures the wall of the bore hole against collapsing. The mud coming to the surface is freed of cuttings by precipitation and flows into a tank from which it is repumped by a piston pump into the dirll pipe. The quantity of mud which is pumped into the hollow drill is a little greater than that which arises from the bore hole, which differences is necessary to compensate the deepening of the bore hole. The pressure which the mud pump has to exercise serves to overcome the circulation resistance of the mud through the drill pipe, through the bit, through the surrounding annulus and through the other pipe lines.

When drilling it may occur that, before the desired depth is reached, a layer is bored containing oil, gas or water under pressure. By the bore pressure in this formation this substance can penetrate into the borehole, at least if this pressure is higher than the hydrostatic pressure of the mud at the bottom of the borehole. Then the well is producing. The inflowing substance then mixes with the mud in the annulus around the drill pipe and causes more mud to flow from the borehole than is pumped into it. This can be observed by a rise in the level in the mud tank. If this process would proceed unhindered, all mud around the drill pipe would be substituted by oil, water or gas. The hydrostatic pressure in the vicinity of the bit will then steadily decrease and at last the well will blow out at the top of the borehole.

In order to prevent this, blow out preventors will be arranged for each drilling operation. These consist generally of two half rings coated with rubber lying around the drill, which are pressed around the drill pipe after its rotation has stopped and so close off the annulus at the top. It goes without saying that before this closing off the mud pump must be stopped.

It will only be possible to drill deeper after the space of the hole has been filled with mud of sufficient specific gravity. The required specific gravity of the mud may be calculated from the pressure in the drill pipe indicated by a manometer on the surface and from the depth of the borehole. It takes some time before one can establish that the well is flowing by observing a rise of the mudpit level or otherwise. In that time the distribution of pressure in the space around the drill will alter because of influx of gas or water is continued. In normal drilling this pressure increases in the downward direction. If gas, oil or water flows in, this pressure will eventually rise and at the well head a higher pressure will occur. Moreover, the mud in the annulus space becomes contaminated with lighter weight material from the formation and this consequently reduces the hydrostatic head of the original, already too light mud column. On the other hand the drill pipe remains completely filled with mud without oil, water or gas. Consequently the pressure at the top of the drill pipe is lower than the pressure at the top of the surrounding annulus. This difference in pressure delivers the energy used for operating the apparatus of the present invention. When the well is closed the gas cannot expand and remains practically at its original pressure and exerts a pressure on the mud column below it with which the hole is filled. The increase of pressure at the top of the mud column in the annulus may result in a breakdown of the wall of the well so that the contents of the well will come to the surface outside the drilled well. This danger of cratering the formation does not exist at once but the risk becomes greater if the well is closed for a longer time. Therefore, normally the well will be opened as quickly as possible at the discharge and mud will be pumped into the drill pipe, whilst the discharge at the annulus will be reduced. Thereby so much counter pressure is exerted on the formation that the deficiency of hydrostatic pressure by the too light mud column is replenished by hydraulic counter pressure which prevents a further production of the formation.

During this circulation the mud is weighted.

In practice it is extremely difficult to adjust the resistance at the discharge and the pump velocity to such an extent that the counter pressure is not either (1) too small by which the well would continue to produce and the mud would be mixed with substances from the formation or (2) that this pressure will not become too high and loss of mud will occur or the formation will break down.

The invention aims at preventing the risk of loss of mud or breaking down of the formation.

In the method according to the invention the energy of the mud emerging from a closed well into which gas, oil or water penetrate, is employed to pump mud into the drill pipe, during which operation the specific gravity of the mud is increased to the required weight by admixing.

As long as the mud has not the required specific gravity and consequently exerts insufficient hydrostatic pressure on the formation, the formation will continue to produce. The quantity of mud then pumped into the well is smaller than the quantity emerging from the well. It is not possible to pump in as much as is emitted. If a greater quantity were pumped in than is emitted the pressure in the well would be heavily increased and the formation in which the hole has been drilled could break down.

If more mud emerges fro mthe well than is pumped through the drill pipe the well would become empty in course of time but this is not possible, for as long as the mud gravity remains too low, the formation will continue to produce and replenish the shortages.

If, however, the mud in the drill pipe has the required gravity the hydrostatic pressure will conquer the pressure of the formation and the well will then produce no more. No pressure can then be read off on the manometer of the drill pipe at the surface.

The pressure at the surface of the annulus will now solely be determined by the difference between the weight of the mud column with the required weight which is present in the drill pipe and the weight of the lighter mud mixed with formation substances present in the annulus. Now that the formation no longer replenishes the shortage as the well does not produce any longer, additional mud is added to replenish the shortage.

An apparatus for executing the method is characterized in that it has either two or four cylinders with pistons having operating surfaces of different size and in that the mud rising from the closed well acts on the biggest surface or surfaces and that weighted mud is pumped into the hollow drill pipe by the smallest surface or surfaces. The greater the difference in pressure at the surface between the annulus and the drill pipe, the greater will be the available energy.

The operation of the apparatus during the bringing under control of a producing well is separated into two stages.

*Stage a.*—The mud pumped into the drill pipe is not heavy enough, there exists a pressure at the surface of the drill pipe, and the shortage of mud in the annulus is replenished with formation substance.

*Stage b.*—The drill pipe is filled with mud of the required weight, and no pressure exists any longer at the surface of the drill pipe. The hydrostatic pressure of the mud column in the drill pipe is greater than the formation pressure. The formation does not produce anymore. The pressure at the surface of the annulus equals the difference in weight between the mud column in the drill pipe and the annulus.

The shortage of pumped in mud, caused by the difference in operation surfaces of the pump is now compensated by a low pressure centrifugal pump which continuously replenishes the shortage when the pistons stop in order to change their direction.

This is now possible because the drill pipe pressure has become nil.

During the entire process no artificial counter pressure is exerted and so no damage can be caused to an undesirably producing well.

When the entire hole has been filled with mud of the required weight the well is brought under control. There is no difference in pressure at the surface between the annulus and the drill pipe.

The apparatus stops operating because the well does not give energy anymore.

Then the well is opened and drilling is proceeded with in the normal way.

The invention will be elucidated by the aid of an embodiment shown in the drawing, in the course of which other characteristics will be shown.

Figure 1:
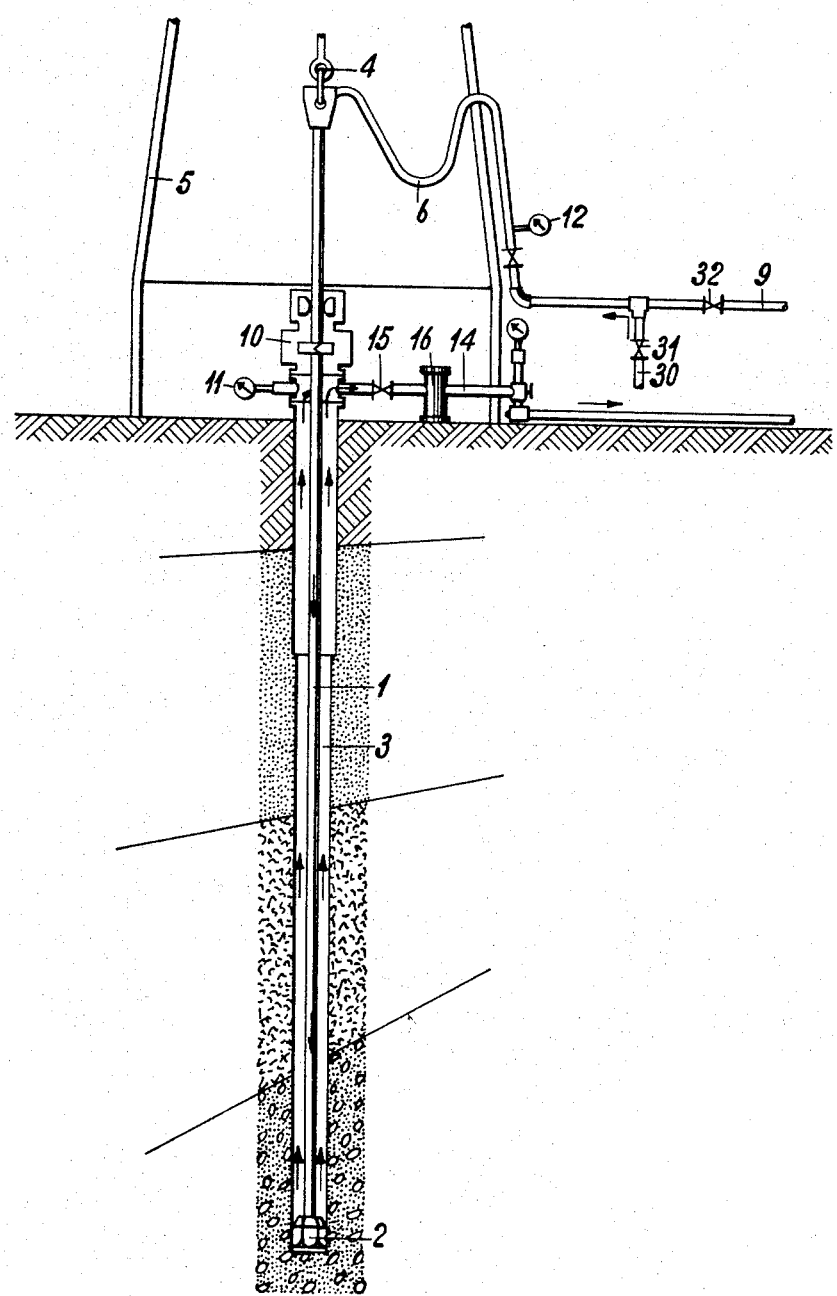
FIG. 1 is a cross section of a bore hole with some equipment required for drilling the hole.

In FIG. 1 the hollow drill pipe is indicated by 1, to the lower end of which a bit 2 is fixed, the latter having a greater diameter than the drill pipe 1. Consequently there is an annular space 3 around the drill pipe 2. The drill pipe 1 is suspended on a hook 4 which is suspended in a drilling derrick 5. The drill pipe 1 can be rotated at the surface by means not drawn, by which bit 2 crushes the rock under the drilling apparatus. To the upper end of the drill pipe 1 a hose 6 is connected through which mud is pumped into the hollow drill pipe 1, which mud penetrates through holes in the bit 2 into the annulus 3 and flows upwards and carries along the crushed rock. The mud overflows the upper end of the well and flows through a mud ditch (not illustrated) to a sediment tank (not illustrated) in which the rock dust precipitates from the mud. Thereupon the mud flows to a tank (not illustrated) and is then pumped by a piston pump again through a pipe line 9 and the hose 6 into the upper end of the drills pipe.

At the place where the drill pipe emerges from the ground a blowout preventor 10 is arranged which is schematically drawn. It can consist of two half rings which can be pressed around the drill pipe 1 and then close off the annulus 3. A manometer 11 indicates the pressure in the annulus 3 and a manometer 12 connected to the mud supply line 6, 9 indicates the pressure in the drill pipe to the annulus 3 and beneath the blowout preventor 10 a pipe line 14 is connected with the valve 15. In this pipe line a relief device 16 may be comprised as described in my co-pending application No. 468.475, filed June 30, 1965, now Patent No. 3,372,761.

Furthermore equipment is required as used in normal drilling and which is known to every expert.

Figure 2:
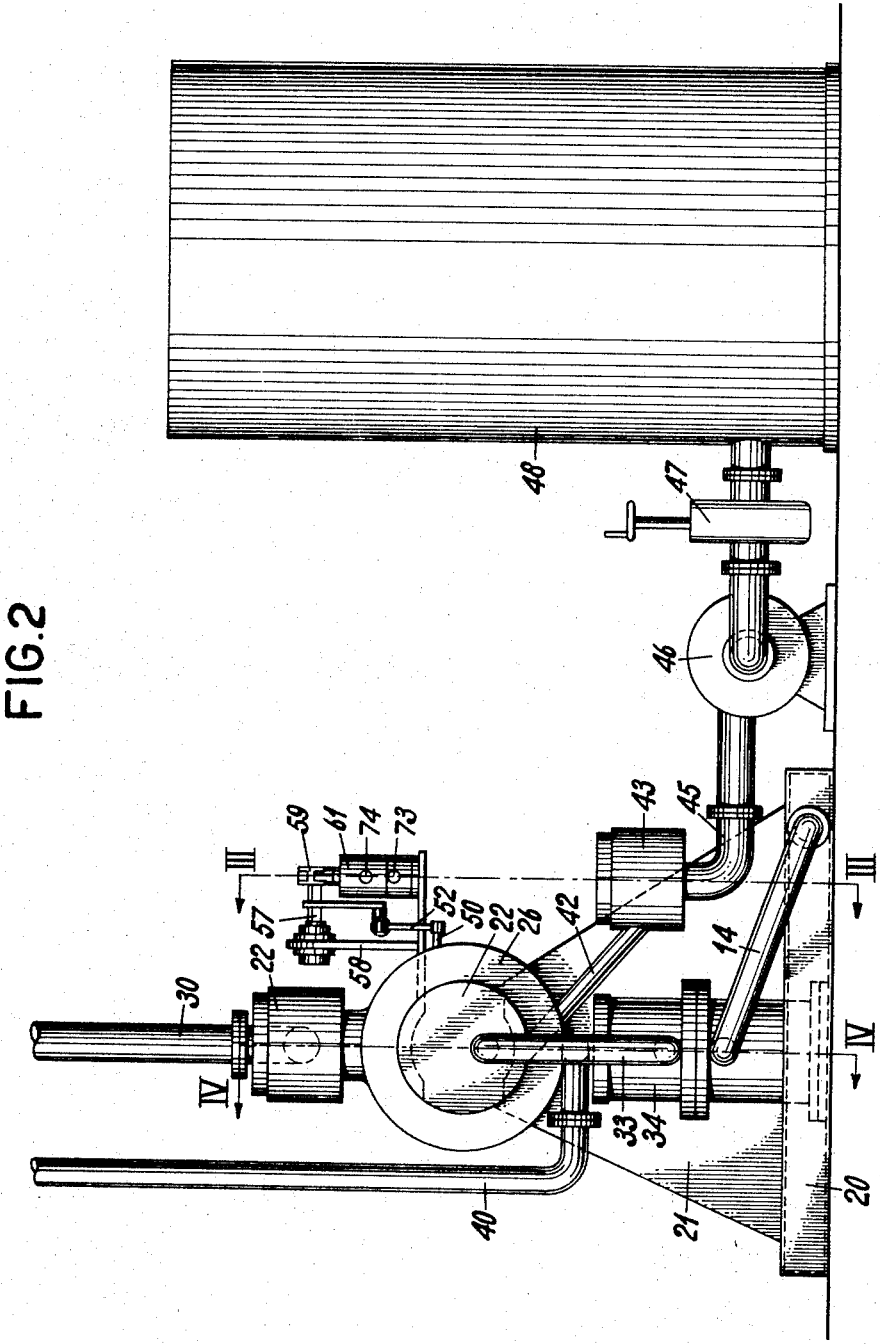
FIG. 2 is a side view of an apparatus according to the invention.
Figure 3:
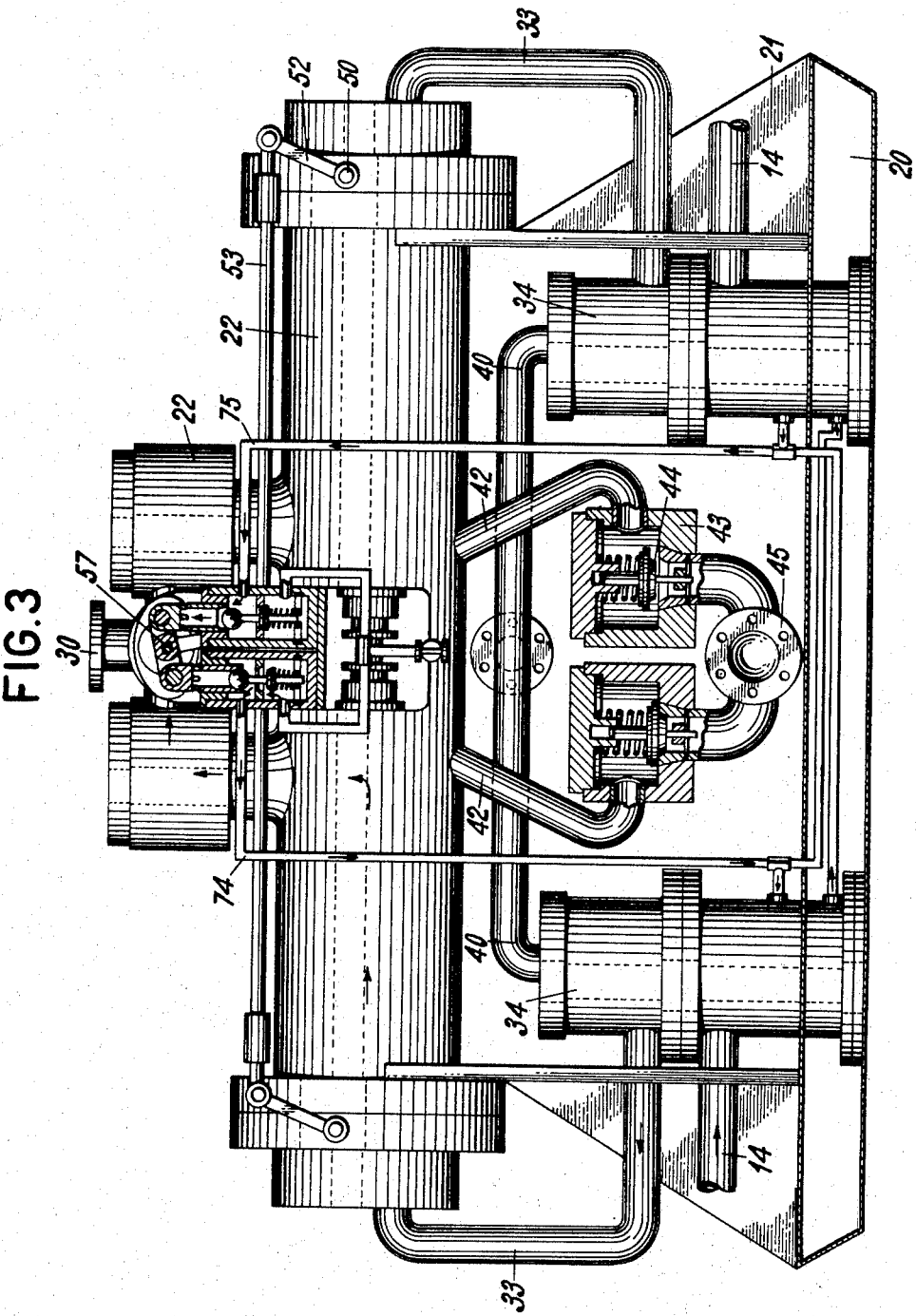
FIG. 3 is a cross section of this apparatus along the lines III—III in FIG. 2 seen in the direction of the arrows.
Figure 4:
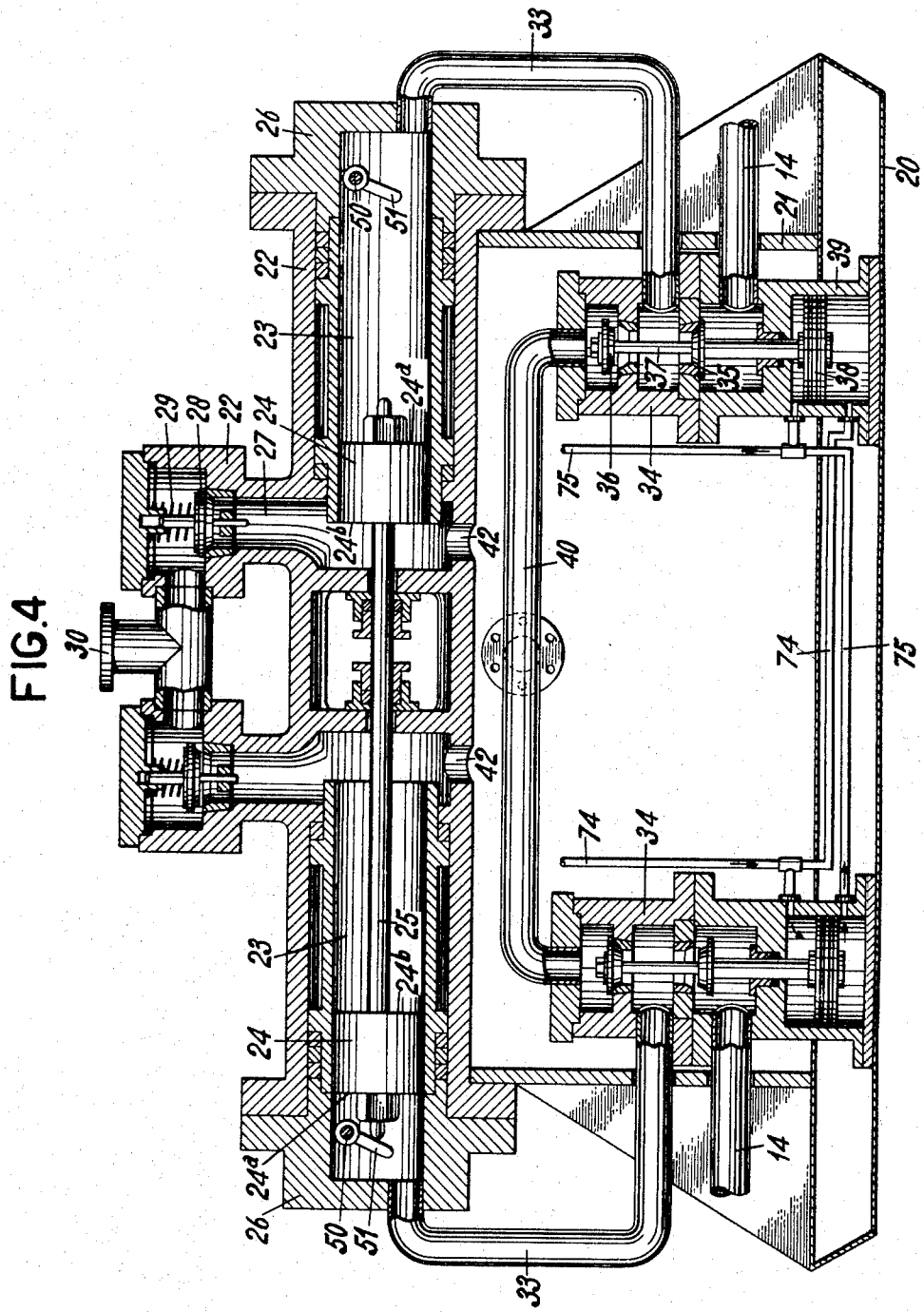
FIG. 4 is a cross section of the apparatus along the lines IV—IV in FIG. 2 seen along the arrows.
Figure 5:
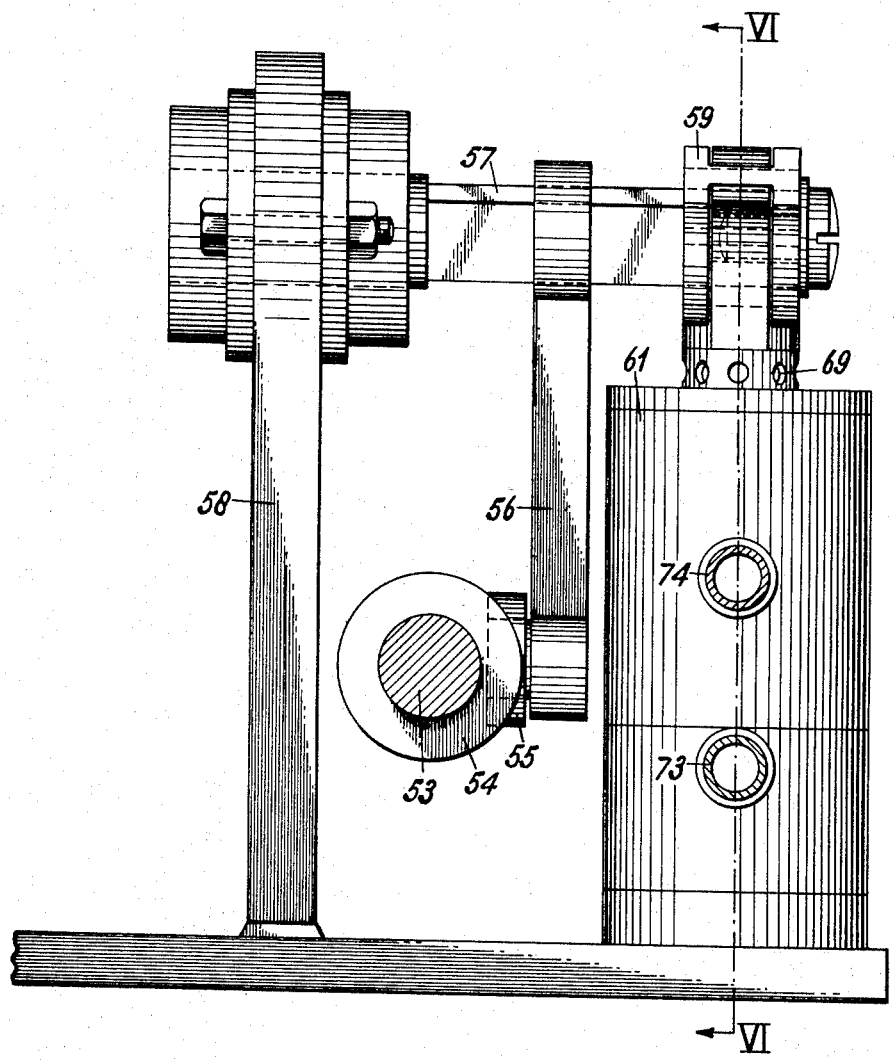
FIG. 5 is a detail on a larger scale of FIG. 2.

The lines 9 and 14 are connected to an apparatus the principal parts of which are shown in FIGS. 2, 3 and 4. If during the drilling operation gas, oil or water flows from the rock into the well in an undesired way, the drill pipe 1 with the bit 2 is stopped and the blowout preventor 10 is closed. The gas or water flowing into the well gives a difference in pressure between the annulus and the drill pipe in the well and this energy is used for driving the apparatus in question.

The apparatus in question has a base 20 with two upwardly extending supporting members 21. On these supporting members 21 lines a housing 22 comprising two similar cylinders 23, one lying in the continuation of the other (FIG. 4). In each cylinder 23 a piston 24 has been movably arranged, said pistons 24 being connected to each other by a piston rod 25. The cylinders 23 are closed at their outer ends by covers 26 and their inner ends are in connection with exhaust valves 28 by channels 27 in the housing 22, which exhaust valves 28 are pressed by springs 29. The discharge sides of these valves 28 are connected with a T-shaped discharge piece 30.

The closed ends of the cylinders 23 are both connected by a tube 33 with a valve housing 34. Both valve housings are identical. Each valve housing 34 has an admission valve 35 and a discharge valve 36 which are interconnected by a mutual handle 37 on which also an air piston 38 is positioned, operating in a part 39 of the valve housing 34, which is executed as air cylinder 39. By admitting or discharging air pressure above or beneath the air piston 38, as will be described later on, the valves 35 and 36 may be opened or closed.

In the space between the valves 35 and 36 the above mentioned pipe line 33 debauches. The admission valve 35 can connect this pipe line 33 with the line 14 which is connected to the well beneath the blowout preventor 10, at which position of the admission valve 35 mud flows from the well into the cylinder 23 against the piston surface 24a. The discharge valve 36 can connect the pipe line 33 with a discharge line 40 through which the mud flows away to the mud tank. If, therefore, the four valves 35 and 36 are moved in the correct rhythm the pistons 24 will go to and fro by energy which is delivered by the well. The pistons are drawing heavy mud with their surfaces 24b facing each other which mud flows into cylinders through the pipe lines 42, of which only the end openings can be seen in FIG. 4.

Each of these lines 42 comes from a valve housing 43 containing a suction valve 44. The valve housings 43 are connected with a suction line 45. This line is the delivery line of a low pressure centrifugal pump 46 supplying weighted mud via valve 47 from the mud tank 48.

The mud coming through the pump 46, the suction valves 44 and the lines 42 in the cylinders 23, is pressed away by the pistons 24 through the delivery valves 28 and the pipe line 30 to the drill pipe 1 (vide FIG. 1). To this end it is essential that the valve 31 is opened and that the valve 32, in the pipe line 9 through which the mud is supplied in normal drilling procedures, is closed.

As the effective surfaces 24b of the pistons 24 which press the heavy mud to the pipe line 30 are smaller than the surfaces 24a of the pistons upon which mud supplied from the well through the pipe line 14 presses, the quantity of heavy mud pumped into the well will be smaller than that of light mud flowing from the well. Therefore, there can never occur too high a pressure in the well by which the well wall could break down and a side-crater could occur. This would, as already explained, render the well useless.

For correctly moving the inlet valves 35 and 36 the following device has been arranged.

In each cylinder 23 in the vicinity of its cover 26 a rotatable rod 50 projects inwardly transversely through the cylinder wall (FIG. 4). An arm 51 is fixed on the inner end of this rod 50. Also the outer end of each rotatable rod 50 an arm 52 has been fixed (vide FIGS. 2 and 3). The ends of these arms 52 are connected swingably to a rod 53. When a piston 24 reaches its outer position it presses away the arm 51 lying in its cylinder, which causes the outer arm 52 to rotate and the connecting rod 53 moves in its longitudinal direction. As a consequence thereof the arm 51 lying in the other cylinder will move too. At the stroke of the pistons 24 the connecting rod 53 will, therefore, move back again. Therefore, the connecting rod 53 is moving to and fro.

This movement of the rod 53 is used to admit and discharge pressure air to the air pistons 38 which displace the inlet valves and the discharge valves 35 and 36.

Figure 6:
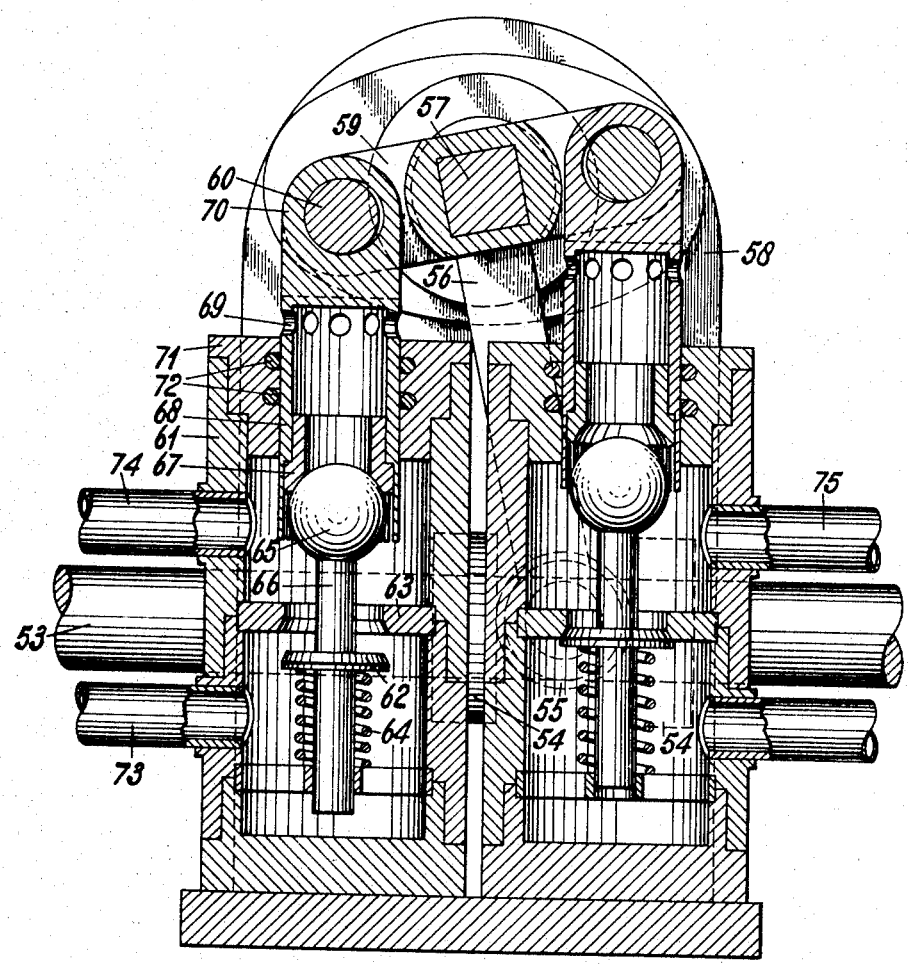
FIG. 6 is a cross section of the detail drawn in FIG. 5 along the line VI—VI in FIG. 5.

To this end two rings 54 are rigidly positioned on the connecting rod 53 (FIG. 6), between which lies a roller or pin 55. This cylinder is connected to an arm 56 which is fixed to a rectangular shaft 57 which is rotatably positioned in a column 58. This column 58 and the air dividing housing 61 are connected to the cylinder 22.

On the rectangular shaft 57 a cross beam 59 is fixed. Its free ends are each connected by a lever pin 60 with a set of air pistons which are arranged in a housing 61 and one of which will be described (vide FIG. 6).

Each set of valves has a flat inlet valve 62 with seat 63 and closing spring 64 and a ball shaped discharge valve 65. Both valves are connected by a valve handle 66. The seat 67 of the ball shaped discharge valve 65 is comprised in a tubular part 68 having discharge openings 69 debauching in the open air. The tubular part 68 is closed at the top and has at that place an elliptical eye 70 through which a lever pin 60 passes.

If the lever pin 60 goes down the tubular part 68 slides through the cover 71 of the valve housing 61, between which parts sealing rings 72 are positioned. The seat 67 then communicates with the ball shaped valve 65 and presses open the inlet valve 62 when going further down. Now air under pressure will flow from the admission line 73 through the opened valve 62 into the line 74.

The pipe line 74 carries, as shown in FIGS. 3 and 4, the air above one of the air pistons 38 and beneath the other air piston. The air at the other sides of the air pistons flows back from the air cylinders 39 through the pipe line 75 to the air division device and through its opened ball shaped valve outwards. If the position of all air pistons is changed by the backstroke of the connecting rod 53 the air under pressure flows through the pipe line 75 to the air cylinders 39 and flows away through the pipe line 74.

The apparatus operates as follows. If it appears from the rise of the mud surface in the mud tank there is an influx in the well, rotating of the drill pipe 1 is stopped and the mud pump (not illustrated) is stopped too.

If necessary the valve 32 in the pressure line 9 of the mud pump is closed too. As the valve 15 in the pipe line 14 which is connected to the annulus 3 in the well, is closed when in normal operation, the well is completely closed. From the pressure indicated by the manometer 12 and the known depth of the well may be calculated how great the specific gravity of the mud must become for a continuation of the drilling. This specific gravity is increased by admixing material. The valve 15 in the pipe line 14, however, is at once opened and so is the valve 31 in the pipe line 30, which pipe lines lead to the described apparatus. The centrifugal pump 46 is started. The high pressure in the pipe line 14 acts on the surfaces 24b of the pistons 24 and the lower pressure in the pipe line 30 on their small surfaces 24b. Through this the pistons 24 will move simultaneously. The air division device comes into action by which the inlet valves and the discharge valves 35 and 36 are displaced. By the centrifugal pump 46 heavy mud is carried to the small acting surfaces 24a of the pistons 24 through the lines 42 and they press this mud through the pipe line 30 into the drill pipe.

The greater the difference in pressure between the annulus and the drill pipe, the quicker the apparatus will operate. If after some time the light mud in the drill pipe is substituted by heavy mud of the required weight, no influx of gas or water in the well will take place any more.

The pressure on the manometer 12 will then be nil, so that the centrifugal pump 46 will press open the valves 44 and 28 and will fill up the drill pipe at the moment that the pistons 24 stop to change their direction.

Then the quantity of mud discharged will not be greater than that pumped in.

If the well is now completely filled with this mud there will be no difference in pressure between the annulus 3 and the drill pipe 1, which will cause the apparatus to stop.

The electrically driven centrifugal pump is now stopped, the valve 15 in the pipe lines 14 and 30 respectively leading to the apparatus is then again closed and the valve 32 in the pipe line 9 is opened, as well as the blow out preventor 10.

The drilling can then be proceeded with in the normal way.

What I claim is:

1. In a system for drilling a well, wherein a pump normally pumps mud into a drill pipe during the drilling operation and wherein the well undesirably starts producing, an apparatus for bringing said undesirably producing well under control comprising a pump means for pumping heavier mud into said drill pipe than that being discharged from the well, conduit means for directing said heavier mud from said pump means to the drill pipe, driving means for said pump means, conduit means for directing fluid from the discharge of the well to said driving means, said driving means being responsive to, and driven by, said fluid from the discharge of the well, said pump means pumping a lesser quantity of said heavier mud into said drill pipe than the quantity of fluid being discharged from said well, means rendering said pump means operative only when said well is undesirably producing during which time the well is not bieng drilled and said normal pump is not operative, said pump means being independent of said pump normally pumping mud into the well during the drilling operation, said driving means being responsive to the difference in pressure between the pressure of the mud being introduced and the pressure of the fluid being discharged, said driving means not driving said pump means when said pressure difference is zero.

2. An apparatus according to claim 1, wherein said pump means is a piston pump having a first active piston surface, a second active piston surface of smaller area than said first surface, said piston pump being driven by the pressure of said fluid against said first active piston surface, and said second active piston surface driving said heavier mud into said conduit means to said drill pipe.

3. An apparatus according to claim 2, wherein said piston pump has two similar pistons interconnected by a piston rod, each piston having a said first active piston surface and a said second active piston surface.

4. An apparatus according to claim 3, wherein said piston pump includes inlet and discharge valves for controlling the fluid acting against said first active piston surfaces, and piston means operated by air under pressure for moving said valves.

5. An apparatus according to claim 1, including centrifugal pump means for pumping additional heavier mud into said drill pipe when said well is brought under control to compensate for the shortage of mud caused by pumping in a lesser quantity of said heavier mud than the quantity of fluid discharged from said well.

6. In a method of drilling a well wherein mud is normally pumped into the well during the drilling operation and said well undesirably starts producing and the pressure of the fluid being discharged from the well is greater than the pressure of the mud being introduced into the well, the method of bringing such undesirably producing well under control comprising stopping the drilling and normal pumping and then utilizing the energy resulting from the difference in pressure between the discharging fluid and the mud being introduced into the well to pump into the well mud heavier than the fluid being discharged from the well in a quantity fixed in relation to the fluid being discharged from the well, the quantity of the heavier mud being introduced being less than the quantity of the fluid being discharged and continuing pumping the heavier mud into the well until the well stops producing.

7. A method according to claim 6 wherein the weight of the mud being introduced into the well is gradually increased until the well is brought under control.

8. A method according to claim 7 wherein the heavier mud is pumped until the pressure at the surface of the well wherein the mud is being introduced drops to zero and then additional mud is automatically pumped into the well to compensate for the shortage of the mud caused by pumping in a lesser quantity than was discharged.

9. A method according to claim 8 wherein the speed at which the heavier mud is pumped in is proportional to the difference of the pressures between the discharge fluid and the heavier mud being introduced.

References Cited
UNITED STATES PATENTS 2,169,675   8/1939   Bays _____ 175—66

OTHER REFERENCES

Bell, Frank S.: High-Pressure Drilling and Blowout Prevention, In Oil & Gas Journal, Oct. 14, 1957, pp. 147–149 relied on.

Uren, Lester C.: Petroleum Production Engineering: Oil Field Development, N.Y., McGraw-Hill, 4th Ed., 1956, pp. 749–751.

JAMES A. LEPPINK, Primary Examiner.

I. A. CALVERT, Assistant Examiner.

U.S. Cl. X.R.

175—217